United States Patent [19]
Rowe et al.

[11] Patent Number: 5,729,073
[45] Date of Patent: Mar. 17, 1998

[54] REMOTE FREQUENCY CONTROL SYSTEM FOR CONTROLLING THE VIBRATIONAL FREQUENCY OF COILS OF A TURBINE GENERATOR STATOR

[75] Inventors: Charles Monroe Rowe, Orlando; John Barry Sargeant, Oviedo, both of Fla.

[73] Assignee: Westinghouse Electric Corporation, Pittsburgh, Pa.

[21] Appl. No.: 734,378

[22] Filed: Oct. 17, 1996

[51] Int. Cl.$^6$ ........................................... H02K 3/46
[52] U.S. Cl. ............... 310/260; 310/51; 310/270
[58] Field of Search ............ 310/51, 260, 270; 267/140.14, 140.15

[56] References Cited

U.S. PATENT DOCUMENTS

| | | | |
|---|---|---|---|
| 3,691,416 | 9/1972 | Drexler et al. | 310/260 |
| 3,866,073 | 2/1975 | Gjaja | 310/260 |
| 3,949,257 | 4/1976 | Cooper et al. | 310/260 |
| 3,974,409 | 8/1976 | Loy | 310/260 |
| 3,988,625 | 10/1976 | Jáger et al. | 310/260 |
| 3,991,334 | 11/1976 | Cooper et al. | 310/260 |
| 4,016,443 | 4/1977 | Johnson | 310/260 |
| 4,088,913 | 5/1978 | Prigorovsky et al. | 310/260 |
| 4,525,642 | 6/1985 | Humphries et al. | 310/260 |
| 4,618,795 | 10/1986 | Cooper et al. | 310/260 |
| 5,373,211 | 12/1994 | Ramirez-Colonel et al. | 310/260 |

*Primary Examiner*—Steven L. Stephan
*Assistant Examiner*—Tran N. Nguyen

[57] ABSTRACT

A remote frequency adjustment system for controlling the vibrational frequency of the coils of a stator of a turbine generator. The system includes a top coil and a bottom coil supported by a coil support brace and a frequency adjustment system that allows for remote adjustment of the characteristic frequency of the coils.

19 Claims, 1 Drawing Sheet

REMOTE FREQUENCY CONTROL SYSTEM FOR CONTROLLING THE VIBRATIONAL FREQUENCY OF COILS OF A TURBINE GENERATOR STATOR

BACKGROUND OF THE INVENTION

1. Field of the Invention

This invention relates to a vibrational control system for maintaining the characteristic frequency of the coils of a stator sufficiently above the operating frequency of the dynamoelectric apparatus to which the coils are affixed in order to avoid potentially destructive vibration from occurring.

2. Description of the Prior Art

In an electrodynamic apparatus such as a turbine generator, the coils of the stator have, like most mechanical objects, a characteristic natural frequency at which they will tend to vibrate. If this characteristic frequency is close to the input frequency of vibrations that are transmitted to the coils during operation of the machine, potentially damaging vibration will tend to build in the coils. This can shorten the life of the coils, causing premature failure. Failure of the coils can cause damage to the generator, which could result in expensive down time, and a need for a coil replacement procedure that tends to be quite expensive.

Conventionally, the coils of a stator are not loaded under pressure. The coil support brace supports the stator coils. The coil support brace is attached to the coil support bracket, which is affixed to the stator core. Unfortunately, however, during operation of the dynamoelectric apparatus the coil support bracket and brace move away from the coils. As the stator core contracts during service, the compressive force transmitted to the coils from the brace decreases. As this force decreases, the characteristic frequency of the coils will lower and may in some cases approach the resonant frequency of the apparatus. As explained above, when this occurs, the coils may suddenly fail or they may fail over time as a result of excessive vibrations. Unfortunately, no system was previously known that prevented this force on the coils from decreasing as the coil support brace and bracket pulls away from the coils. If the preload can be maintained on the coils, then the characteristic frequency of the coils will not approach the natural frequency of the apparatus.

Moreover, by maintaining the frequency sufficiently above the natural frequency of the apparatus, the life of the coils will be extended and the likelihood of failure from vibration will be minimized.

Additionally, no system had been devised to control the vibrational frequency of the coils from a remote location outside of the generator. A system that allows for a remote adjustment of the vibrational frequency of the coils would have the additional advantage of allowing for a frequency adjustment without having to enter the turbine generator. Consequently, a remote operating system would prevent the costly repairs and the costly lost generator operating time associated with entering a generator.

Thus, it is clear that there has existed a long and unfulfilled need in the prior art for a system which provides a vibrational control system to maintain the characteristic frequency of the stator coils away from the natural frequency of the apparatus to which the coils are attached during operations of the apparatus. It is further clear that there has existed a need for a system that will allow an operator to remotely adjust the vibrational frequency of the coils of a turbine generator.

SUMMARY OF THE INVENTION

Accordingly, it is an object of this invention to provide for a system that will permit an operator to remotely adjust the vibrational frequency of the coils of a turbine generator to prevent the coils from vibrating at or near their resonant frequency.

It is a further object of this invention to permit an operator to remotely adjust the vibrational frequency of coils of a turbine generator without the need to enter the generator.

It is a further object of this invention to provide for a system that remotely adjusts the vibrational frequency of coils of a turbine generator so that the frequency can be adjusted as required. By adjusting the frequency of the coils, excessive vibrations of the coils will be minimized, the life of the coils will be extended and the likelihood of failure of the coils will be reduced along with any subsequent damage due to their failure.

In order to achieve the above and other objects of the invention, a remote frequency adjustment system includes according to a first aspect of the invention, a top coil and a bottom coil supported by a coil support brace, and a frequency adjustment apparatus for remotely adjusting the vibrational frequency of the coils.

According to a second aspect of the invention, the system includes a push block resting on the coil support brace and supporting the bottom coil and the top coil.

According to a third aspect of the invention, the remote frequency adjustment apparatus includes a void in a bottom of the push block; the void being aligned with a cavity in the coil support brace; a cylinder inside of the cavity which applies the force to vary the characteristic frequency of the coils; a movable push rod connected to the cylinder and extending through the cavity and into the void; a source of fluid connected to the cylinder; and a controlling means for controlling the amount of pressure in the cylinder.

According to a fourth aspect of the invention, the frequency adjustment apparatus includes a pull rod connected to the cylinder rather than the push rod and the push block. The pull rod connects to the coils to transmit the force from the pressurized cylinder.

According to a fifth aspect of the invention, the controlling means includes a pressure adjustment means for adjusting the pressure in the cylinder, a sensing means for sensing the vibrational frequency of the coils, and a signaling means for signaling the pressure adjustment means in response to said sensing means.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENTS

Figure 1:
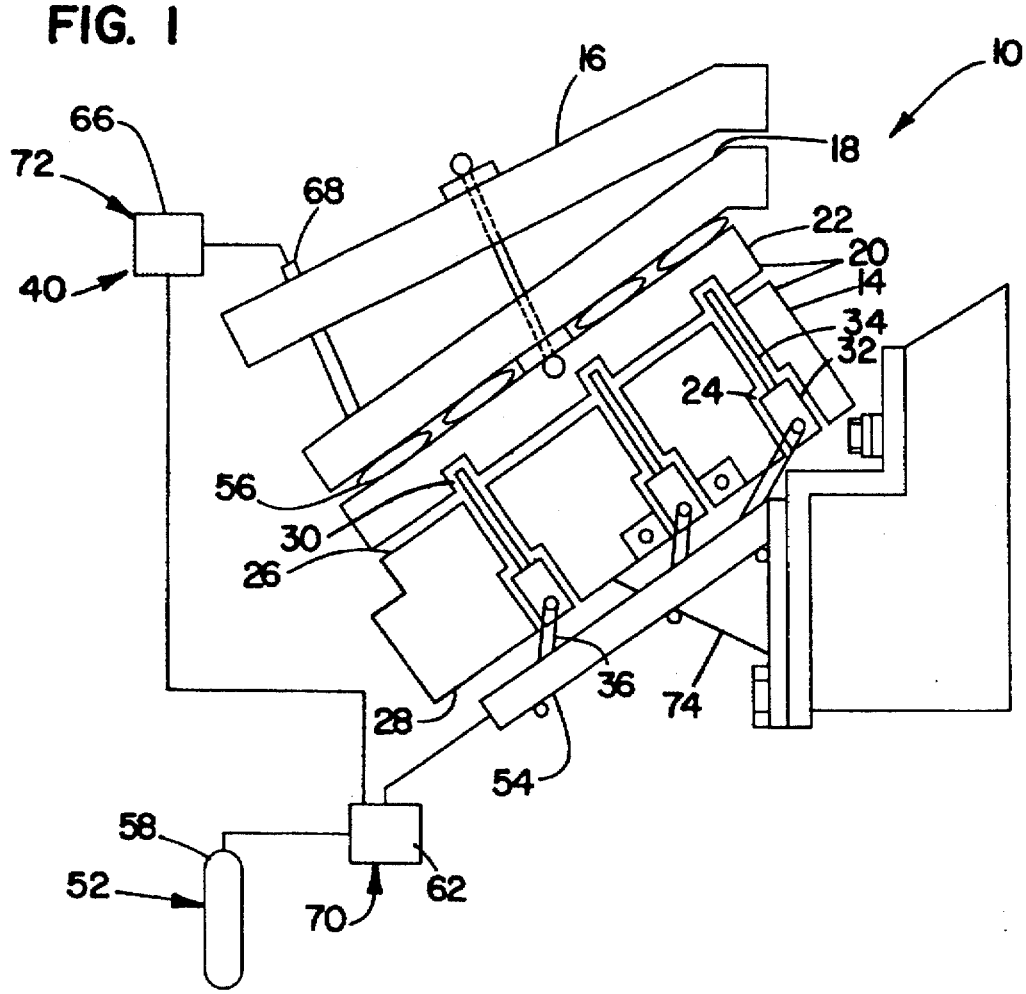
FIG. 1 is a diagrammatical view of a remote frequency adjustment system for coils of a turbine generator that is constructed according to a preferred embodiment of the invention.

Referring now to the drawings, wherein like reference numerals designate corresponding structure throughout the views, and referring in particular to FIG. 1, a remote frequency adjustment system 10 is constructed according to a preferred embodiment of the invention which includes a coil support brace 14, a top coil 16, a bottom coil 18 and a frequency adjustment apparatus 20 which is coupled to the coil support brace 14.

The frequency adjustment apparatus 20 includes a push block 22 resting on the coil support brace 14, a cavity 24 in the coil support brace 14 extending from a top 26 of the coil support brace 14 to the bottom of the coil support brace 28, a void 30 in the push block 22 aligned with the cavity 24, a cylinder 32 inside of the cavity 24, a moveable push rod 34 connected to the cylinder 32 and extending from the cavity 24 into the void 30, and a hose 36 connected to the cylinder 32. The frequency adjustment apparatus 20 also includes a remote source of fluid 52 connected at a hose 36 and a controlling apparatus 40 for controlling the amount of pressure in the cylinder 32. The system also contains a hose manifold 54 which is connected to the hose 36 and the remote source of fluid 52.

Figure 2:
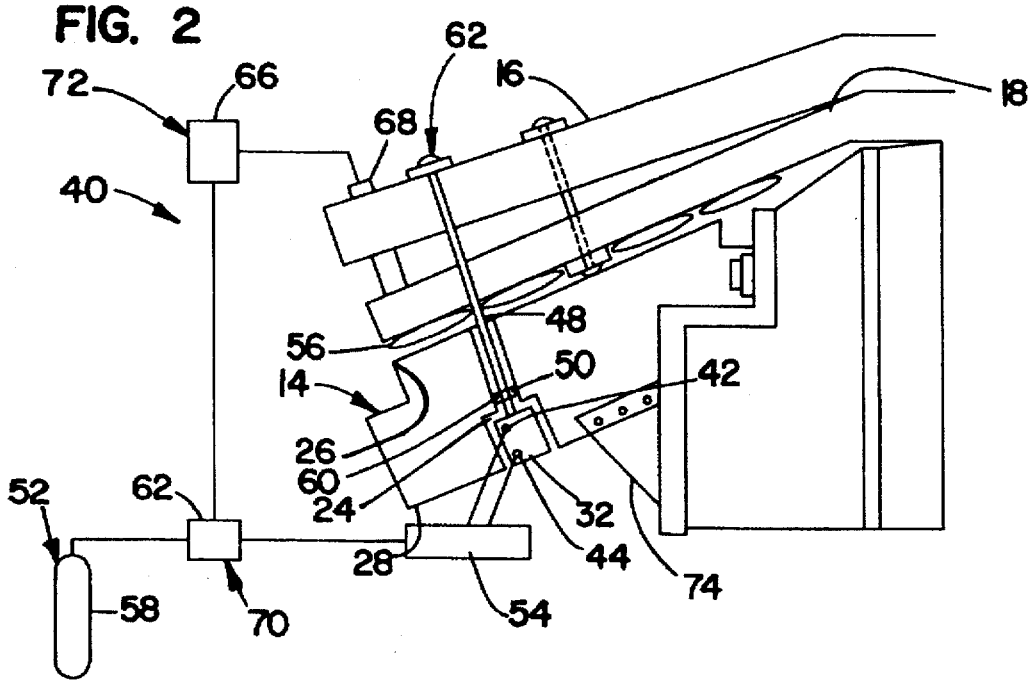
FIG. 2 is a diagrammatical view depicting another embodiment of a remote frequency adjustment system.

As shown in FIGS. 1 and 2, the system may also include a coil support bracket 74 with the coil support brace 14 mounted to the bracket 74.

The remote source of fluid 52 is preferably hydrogen gas 58 or it may be oil or an equivalent fluid. The hydrogen gas 58 is preferably pressurized to a pressure of about 250 or greater psi. The remote source of fluid 52 is connected to the cylinder 32 through the hose 36. The fluid pressurizes the cylinder 32 so that the cylinder 32 can apply a force to the coils 16, 18 as described below. Additionally, as may be seen in FIG. 1, the system also contains a filler 56 compressibly arranged between the push block 22 and the bottom coil 18.

In the embodiment of FIG. 1, the cylinder 32 is pressurized with the fluid. The pressurized cylinder 32 then applies a force to the bottom coil 18 in order to force the bottom coil 18 toward the top coil 16. By compressing the coils 16, 18 the characteristic frequency of the coils 16, 18 is raised. More specifically, the pressurized cylinder 32 pushes against the push rod 34, which pushes against the push block 22. The push block 22 then pushes against the bottom coil 18. By applying a force to the coils 16, 18 the characteristic frequency of the coils 16, 18 is changed. In this embodiment, the pressure in the cylinder 32 can be varied by varying the pressure of the fluid. By varying the pressure in the cylinder 32, the force applied to the coils 16, 18 varies, and the characteristic vibrational frequency of the coils 16, 18 varies in relation to the change in force.

Referring now to FIG. 2, the frequency adjustment apparatus 20 could alternatively include a coil support brace 14, a cavity 24 in the coil support brace 14 extending from a top of the coil support brace 26 to a bottom of the coil support brace 28, a cylinder 32 inside of the cavity, a movable pull rod 48 connected to the cylinder 32 by a connecting apparatus 50 and attached to the top coil 16 by an attaching apparatus 62. The cylinder 32 has at least one inlet 42, at least one outlet 44, a hose 36 attached to the inlet 42 and the outlet 44 and a source of pressurized fluid 52 connected to the hose 36. In a preferred embodiment, the connecting apparatus 50 is a pin 60. Additionally, the frequency adjustment apparatus 20 includes a controlling apparatus 40 for controlling the pressure in the cylinder 32. In this embodiment, the pull rod 48 pulls the top coil 16 and the bottom coil 18 downwardly toward the coil support brace 14 to transmit the force from the pressurized cylinder 32 to the coils 16, 18. This also results in the characteristic frequency of the coils 16, 18 being varied.

In either embodiment described above, the controlling apparatus 40 includes a sensing apparatus 68, a pressure adjustment apparatus 70 and a signaling apparatus 72. The sensing apparatus 68 senses the vibrational frequency and/or amplitude at one or more selected portions of the coils, and is a transducer that is of a known type, such as a piezoelectric transducer or a fiber optical sensing mechanism. Sensing apparatus 68 is in communication with the signaling apparatus 72 which is electrically programmed to cause the pressure adjusting apparatus 70 to adjust the pressure in the cylinder 32 in order to vary the frequency of the coils 16, 18. Preferably, the signaling apparatus 72 is a CPU 66 and the pressure adjusting apparatus 70 is a pump or a valve of known type. In this embodiment, the sensing apparatus 68, the signaling apparatus 72 and the pressure adjustment apparatus 70 could operate to automatically adjust the frequency of the coils in response to the sensed frequency. Alternatively, these components could be manually operated. For example, the pressure adjusting apparatus could be manually overridden.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:

1. A remote frequency adjustment system for adjusting a characteristic vibrational frequency of coils of a stator, said system comprising:

a coil support brace;

a top coil and a bottom coil supported by said coil support brace; and a frequency remotely adjustment means for adjusting the vibrational frequency of the coils.

2. The system as described in claim 1, wherein said frequency adjustment means comprises:

a push block resting on said coil support brace and having a void in a bottom of the push block; the void being aligned with a cavity in said coil support brace;

a cylinder inside of said cavity;

a movable push rod connected to said cylinder and extending through the cavity and into the void;

a source of fluid connected to said cylinder; and a controlling means for controlling the amount of pressure in said cylinder with the fluid.

3. The system as described in claim 2, wherein the controlling means comprises pressure adjustment means for adjusting the pressure of the fluid, a sensing means for sensing the vibrational frequency of the coils, and a signaling means for signaling the pressure adjustment means in response to said sensing means.

4. The system as described in claim 1, wherein said frequency adjustment means comprises:

a cavity in said coil support brace;

a cylinder inside of said cavity;

a movable pull rod connected to said cylinder and said top coil;

a source of fluid connected to said cylinder; and a controlling means for controlling the amount of pressure in the cylinder.

5. The system as described in claim 4, wherein the controlling means comprises pressure adjustment means for adjusting the pressure of the fluid, a sensing means for sensing the vibrational frequency of the coils, and a signaling means for signaling the pressure adjustment means in response to said sensing means.

6. The system as described in claim 2, wherein said fluid is hydrogen gas.

7. The system as described in claim 2, further comprising a hose manifold.

8. The system as described in claim 3, wherein the fluid is hydrogen gas.

9. A remote frequency adjustment system for adjusting a characteristic vibrational frequency of coils of a stator, said system comprising:

a bottom coil;

a top coil;

a coil support brace;

a push block resting on said coil support brace and supporting said bottom coil and said top coil; and a frequency adjustment means for adjusting the vibrational frequency of the coils.

10. The system as described in claim 9, wherein said frequency adjustment means comprises:

a void in a bottom of the push block; the void being aligned with a cavity in said coil support brace;

a cylinder inside of said cavity;

a movable push rod connected to said cylinder and extending through the cavity and into the void;

a source of fluid connected to said cylinder; and a controlling means for controlling the amount of pressure in said cylinder.

11. The system as described in claim 10, further comprising a hose manifold.

12. The system as described in claim 9, wherein the controlling means comprises pressure adjustment means for adjusting the pressure of the fluid, a sensing means for sensing the vibrational frequency of the coils, and a signaling means for signaling the pressure adjustment means in response to said sensing means.

13. The system as described in claim 9, further comprising a filler arranged between the push block and the bottom coil.

14. The system as described in claim 10, wherein said fluid is hydrogen gas.

15. The system as described in claim 1, further comprising means for sensing vibration in the stator coils, and wherein said adjustment means is responsive to said sensing means.

16. The system as described in claim 2, wherein the source of fluid and the cylinder are connected by a hose.

17. The system as described in claim 4, wherein the source of fluid and the cylinder are connected by a hose.

18. The system as described in claim 10, wherein the source of fluid and the cylinder are connected by a hose.

19. A remote frequency adjustment system for adjusting a characteristic vibrational frequency of coils of a stator, said system comprising:

a coil support brace having a cavity;

a top coil and a bottom coil supported by said coil support brace;

a cylinder inside of said cavity;

a movable pull rod connected to said cylinder and said top coil; and a controlling means for controlling the amount of pressure in the cylinder.

\* \* \* \* \*